United States Patent [19]

Hodges

[11] Patent Number: 4,755,868
[45] Date of Patent: Jul. 5, 1988

[54] HIGH BRIGHTNESS PROJECTION TV SYSTEM USING ONE OR MORE CRTS WITH A CONCAVE PHOSPHOR SURFACE ACTING TO CONCENTRATE LIGHT INTO A LENS SYSTEM

[75] Inventor: Marvin P. Hodges, Westlake Village, Calif.

[73] Assignee: TDS Patent Management, Inc., Scarsdale, N.Y.

[21] Appl. No.: 78,317

[22] Filed: Jul. 27, 1987

Related U.S. Application Data

[63] Continuation-in-part of Ser. No. 578,041, Feb. 8, 1984, abandoned, and a continuation-in-part of Ser. No. 916,140, Oct. 7, 1986, abandoned.

[51] Int. Cl.$^4$ .................... H04N 9/31; H04N 5/74; H01J 29/10; H01J 31/00
[52] U.S. Cl. .................... 358/60; 358/231; 358/237; 358/250; 313/474; 313/478
[58] Field of Search ............. 358/60, 231, 237, 236, 358/239, 56, 64, 230, 250; 313/474, 477 R, 478, 371; 350/412, 432

[56] References Cited

U.S. PATENT DOCUMENTS

| | | | |
|---|---|---|---|
| 2,172,775 | 9/1939 | Schmidt-Ott et al. | 358/237 |
| 2,188,581 | 1/1940 | Schlesinger | 358/237 |
| 2,747,460 | 5/1956 | Calvi | 358/60 |
| 4,150,320 | 4/1979 | Mitchell et al. | 313/478 |
| 4,151,554 | 4/1979 | Tucker | 358/60 |
| 4,249,205 | 2/1981 | Buchroeder | 358/60 |
| 4,274,110 | 6/1981 | Lehnert | 358/60 |
| 4,376,949 | 3/1983 | Rowe | 358/60 |
| 4,453,178 | 6/1984 | Miyatake et al. | 358/60 |
| 4,511,927 | 4/1985 | Bauer | 358/231 |
| 4,576,442 | 3/1986 | Oguino | 350/412 |
| 4,609,945 | 9/1986 | Oguind | 358/237 |
| 4,642,695 | 2/1987 | Iwasaki | 358/237 |
| 4,651,217 | 3/1987 | Yamazaki | 358/60 |
| 4,672,458 | 6/1987 | McKechnie | 358/237 |

FOREIGN PATENT DOCUMENTS

| | | | |
|---|---|---|---|
| 53-8020 | 1/1978 | Japan | 358/237 |
| 58-44657 | 3/1983 | Japan | 358/237 |
| 60-100346 | 6/1985 | Japan | 358/60 |
| 2119113 | 11/1983 | United Kingdom | 350/432 |

Primary Examiner—Edward L. Coles, Sr.
Assistant Examiner—Randall S. Svihla
Attorney, Agent, or Firm—Pollock, Vande Sande & Priddy

[57] ABSTRACT

A multiple tube projection television system. At least two image generating cathode ray tubes are provided, having an image generating surface which is concave. The radius of curvature of the image generating tubes is selected to be between 1.2 and 2 times the image diagonal of each tube. Dichroic mirror means are provided to combine the images produced from each tube. A projection lens system is positioned at an optical distance from each tube which is substantially equal to the radius of curvature of the concave phosphor surface. The combination provides for an optimum amount of light to the entrance aperture of the projection lens system.

16 Claims, 5 Drawing Sheets

HIGH BRIGHTNESS PROJECTION TV SYSTEM USING ONE OR MORE CRTS WITH A CONCAVE PHOSPHOR SURFACE ACTING TO CONCENTRATE LIGHT INTO A LENS SYSTEM

BACKGROUND OF THE INVENTION

This invention relates generally to projection systems, and more particularly, to television projection systems that project images from the face or faces of one or more cathode ray tubes onto a viewing screen, and is a continuation-in-part application of Ser. No. 578,041, filed Feb. 8, 1984, now abandoned, and a continuation-in-part of Ser. No. 916,140, filed Oct. 7, 1986, now abandoned.

DESCRIPTION OF THE PRIOR ART

Projection television systems are known. Such systems may be black and white or color projection systems, as well as front projection or rear projection systems. In addition, systems employing a single cathode ray tube and systems employing multiple cathode ray tubes are known. Generally, black and white systems employ only a single cathode ray tube, but color television projection systems may employ either a single color cathode ray tube or three individual cathode ray tubes, one for each primary color, whose images are combined to form a single color image.

While such prior art systems do generate a viewable image, the brightness of such systems is limited, and consequently, such systems are generally viewed in dark or dimly lighted rooms. As a result, manufacturers of projection television systems have sought to improve the brightness of such systems. The attempts to increase brightness included the design of more efficient electron guns, the use of higher cathode beam currents, the use of exotic phosphors and refinements in the projection lens systems and viewing screens. While the aforementioned refinements did indeed result in increased picture brightness, additional brightness is still desirable.

Moreover, the use of higher beam currents has resulted in new problems such as early tube failures, excessive heat, loss of resolution and greater voltage requirements which can cause potential X-ray hazards and greater energy consumption. The use of narrow angle projection systems and high gain viewing screens increases the on-axis brightness but results in a substantial loss of brightness for off-axis viewing.

SUMMARY OF THE INVENTION

Accordingly, it is an object of the present invention to provide a projection television system that overcomes many of the disadvantages of the prior art systems.

It is yet another object of the present invention to provide a projection television system that has a higher brightness picture than comparable prior art projection systems.

It is yet another object of the present invention to provide a projection television system that improves the efficiency of the light transfer between the faceplate of the cathode ray tube and the projection lens system in order to improve picture brightness.

It is still another object of the present invention to provide a projection television system that utilizes multiple cathode ray tubes having concave light emitting surfaces whose curvatures are optimized to maximize the transfer of light from the faceplate to the projection lens system.

It is yet another object of the present invention to provide a projection television system that optimizes the transfer of light from the cathode ray tube to the lens system by utilizing a cathode ray tube having a concave light emitting surface that is concentric to the effective light entry point of the lens system.

Therefore, in accordance with a preferred embodiment of the invention, there is provided a television projection system that utilizes one or more cathode ray tubes having concave light emitting surfaces, when viewed from the front, that are aligned with a projection lens system that relays the image to a viewing screen. The curvature of the light emitting surface(s) is optimized as a function of the distance between the light emitting surface(s) and the effective light entry point of the lens system in order to achieve improved optical coupling between the light emitting surface(s) and the lens system. Additionally, the image tube diagonal and radius of curvature are selected to provide optimum brightness in the useful radiation angle of the tube. Ideally, the radius of curvature of the light emitting surface should be approximately equal to the distance of the effective light entry point, which in many instances is equal to the distance to the entrance pupil. The radius of curvature should be in the range of approximately six inches to twelve inches for a five inch diagonal measure cathode ray tube. In order to obtain the benefits of having an optical distance from each tube image generating surface to the projection optics equal to the radius of curvature, the curvature of the tube may be changed. In three tube projection systems, it is found that the ratio of image diagonal D to the radius of curvature R which may be 3–12 inches, is selected to lie within the range of $1.2 < /R < 2.0$. The advantages of light concentrations using a concave image surface are retained when this relationship is observed and when the on axis distance from each image generating surface to the entrance pupil is equal to the radius of curvature.

Concave faceplate cathode ray tubes had previously been utilized in projection television systems for the purpose of simplifying the design of the optics while minimizing picture distortion. One such system is disclosed in U.S. Pat. No. 4,249,205 and another is described in U.S. patent application Ser. No. 369,411 filed Apr. 19, 1982, now abandoned. Although both of the above described systems utilize cathode ray tubes having a concave faceplate, the curvature of the faceplate is selected to simplify the design of the projection lens. No appreciation of the increase in total light output which can be realized was appreciated at the time of the making of the invention in the U.S. Pat. No. 4,249,205. The relationship between the radius of curvature of the light emitting surface on such a faceplate and the distance of the effective light entry point required to provide optimum brightness was not appreciated, nor was the fact that the shape of the faceplate expressed as the radius of curvature to image diagonal of the cathode ray tube may be selected to take advantage of the aforesaid relationship between the image surface radius of curvature and distance to the light collection point. A coupling medium may be used to take advantage of the optimized brightness.

DESCRIPTION OF THE DRAWINGS

These and other objects and advantages of the present invention will become readily apparent upon consideration of the following detailed description and attached drawings wherein.

DETAILED DESCRIPTION OF THE PREFERRED EMBODIMENT

When an area of phosphor is excited by an electron beam, the area thus excited, and hereinafter referred to as a dot, will produce a radiation pattern that has a size and an intensity determined by the size and the power of the electron beam impinging on the phosphor. The radiation pattern of the light radiated by such a dot will be determined by the radius of curvature of the phosphor layer, which is normally determined by the radius of curvature of the surface on which the phosphor layer is deposited. If the phosphor is deposited on a flat surface, the energy distribution of the light radiated from such a dot is more Lambertian than from a concave surface. In a Lambertian distribution, the light radiates in all directions with substantially equal intensity. If, however, the surface on which the phosphor is deposited is curved, particularly in the case where the surface is concave from the viewing side, the surface will act much like a curved reflector and tend to concentrate the radiated energy along a normal axis passing through the center of the dot.

Figures 1, 2:
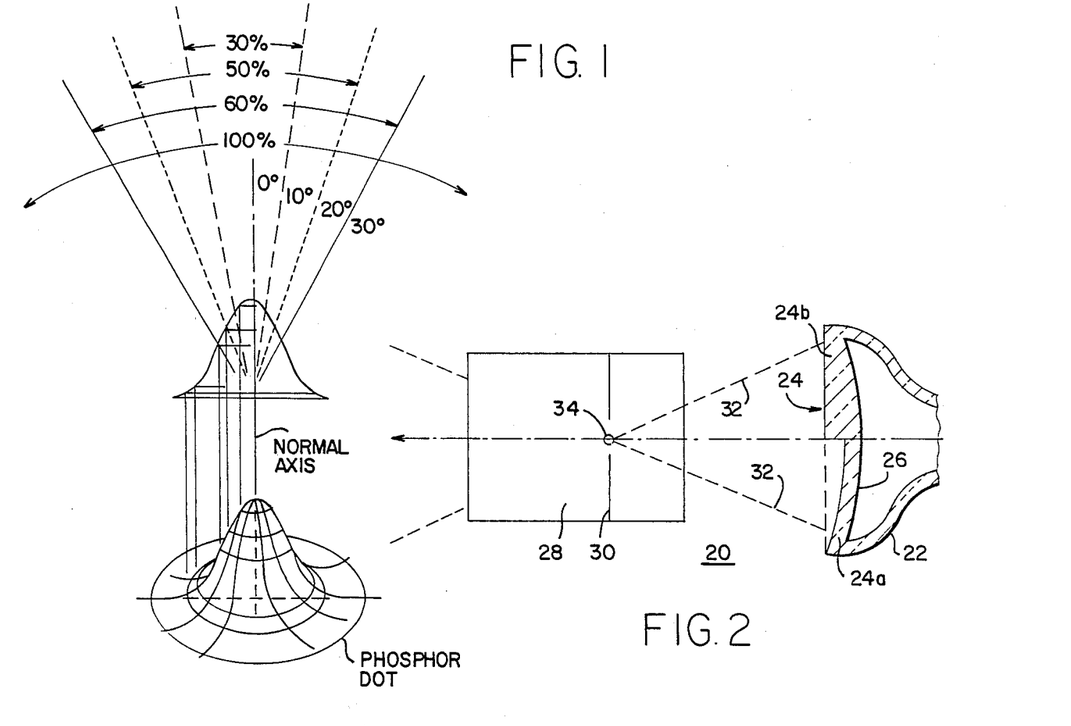
FIG. 1 is an illustration of a light energy lobe having a Gaussian energy lobe of electron beam spot luminance which results from a phosphor element.
FIG. 2 illustrates a single tube projection system according to the invention utilizing a cathode ray tube having a concave light emitting surface for improving the brightness of the projected image.

FIG. 1 illustrates the radiation lobe of a light emitting phosphor element. The energy distribution tends to be Gaussian, with 50% of the total radiated energy within a 40° cone arc as shown.

In addition to affecting the shape of the energy distribution function of the dot as it moves along the screen, the shape of the light emitting surface of the cathode ray tube also affects the overall distribution of energy produced by the cathode ray tube. For example, for a cathode ray tube having a flat light emitting surface, the radiation pattern produced by each dot is more Lambertian, and the radiation pattern is oriented along an axis parallel to the normal axis of the faceplate. Thus, since the light emitting surface is flat, the resultant pattern results from a combination of multiple Lambertian distributions, each parallel to the normal axis of the light emitting surface, thus resulting in a relatively uniform dispersion of light from the faceplate. Such a uniform dispersion is preferable for direct view cathode ray tubes because it results in a fairly wide viewing angle; and modern direct view cathode ray tubes tend to be convex to further increase the viewing angle.

However, if the light emitting surface of the cathode ray tube is made concave when viewed from the viewing side, not only is the radiation pattern of each individual dot changed to essentially a Gaussian distribution, but the orientations of the individual radiation patterns with respect to each other is altered. This occurs because the radiation pattern of each individual dot remains parallel to the normal axis shown in FIG. 1 passing through the center of the dot; however, because the light emitting surface is curved, the normal axes are no longer parallel to each other as in the case of a flat light emitting surface. Rather, the orientations of the radiation patterns are tilted inwardly toward the normal axis passing through the center of the faceplate of the cathode ray tube, with the amount of tilt being greater for those dots near the periphery of the face of the cathode ray tube than for those near the center. This results in an overall concentration of energy along the central axis of the cathode ray tube which can be used to advantage to increase the brightness of projection television systems.

The result of the curved surface is to direct more of available light into a useful angle which permits a smaller aperture to capture more energy than would be captured if a flat surface of equal image generating area were produced. Thus, as will be evident from the following, more energy can be collected by a given entrance pupil area utilizing a curved surface than a flat surface.

The size of the projection optics entrance aperture is thus kept to a minimum, keeping the cost of the optics at a minimum.

Referring now to FIG. 2, there is illustrated a single tube embodiment of a projection television system generally designated by the reference numeral 20. The system 20 according to the invention, utilizes a single cathode ray tube 22 having a faceplate 24 that has a light emitting surface 26 that is concave when viewed from the viewing side upon which the phosphor is deposited. The cathode ray tube 22 may be either a black and white or a color cathode ray tube, and may have a uniform thickness faceplate as shown by the portion 24a or a non-uniform thickness faceplate 24b. A lens system 28, which may be a single lens or a multiple lens system, is used to project the image from the cathode ray tube 22 onto a screen (not shown).

As previously discussed, the faceplate 24 may be either uniform or non-uniform in thickness. This is because the radiation pattern of the phosphor deposited on the light emitting surface 26 is determined only by the shape of the surface 26 and not by the shape of the outer surface of the faceplate. It is true that a non-uniform thickness faceplate, such as the portion of the faceplate designated as 24b, may optically alter the energy distribution generated by the phosphor. Consequently, in many instances it is desirable to use a constant thickness of the faceplate such as the portion of the faceplate designated as 24a. However, in other instances it may be desirable to utilize a non-uniform thickness faceplate when a particular shape of faceplate, such as, for example, a flat faceplate, is desirable to interface with other optics.

Every lens system that is suitable for television projection has a zone or area which it "sees" and transfers to the projection screen. Thus, by concentrating the energy from the cathode ray tube within that zone or area "seen" by the lens system, the brightness of the projected picture can be enhanced. Such a zone or area may be the entrance pupil, a collimation point or an objective lens, and concentrating the energy into such a point has the effect of concentrating more energy into the aperture of the lens to thereby increase the amount of energy that can be transmitted through the lens system.

In the embodiment illustrated in FIG. 2, the energy is concentrated toward an entrance pupil 30; however, as previously stated, it may be concentrated toward a collimation point or any other effective light entry point. This is accomplished by making the radius of curvature of the phosphor supporting surface 26 of the cathode ray tube 22 substantially equal to the distance between the surface 26 and the effective light entry point, such as the entry pupil 30. In addition, the surface 26 should be optically concentric about the effective light entry point as is illustrated by a pair of radii 32 extending from a central point 34 of the effective light entry point. For optimum performance, the surface 26 should be concentric in both the horizontal and vertical planes. If the radius of curvature is selected to be 0.707 times the maximum linear image dimension, the light within the half brightness point of the Gaussian distribution pattern will be captured. Additionally, to minimize Brewster's Law of Refraction, the faceplate thickness should exceed 10% of the image diagonal.

The location of the entrance pupil at the radius of curvature R may be subject to certain constraints where three tube projection systems are employed. By adjusting the image tube diagonal D and radius of curvature R such that $1.2 < R/D$, it will be possible to place each of the three tubes at an optical distance from the projection optics equal to the radius of curvature R.

Figure 3:
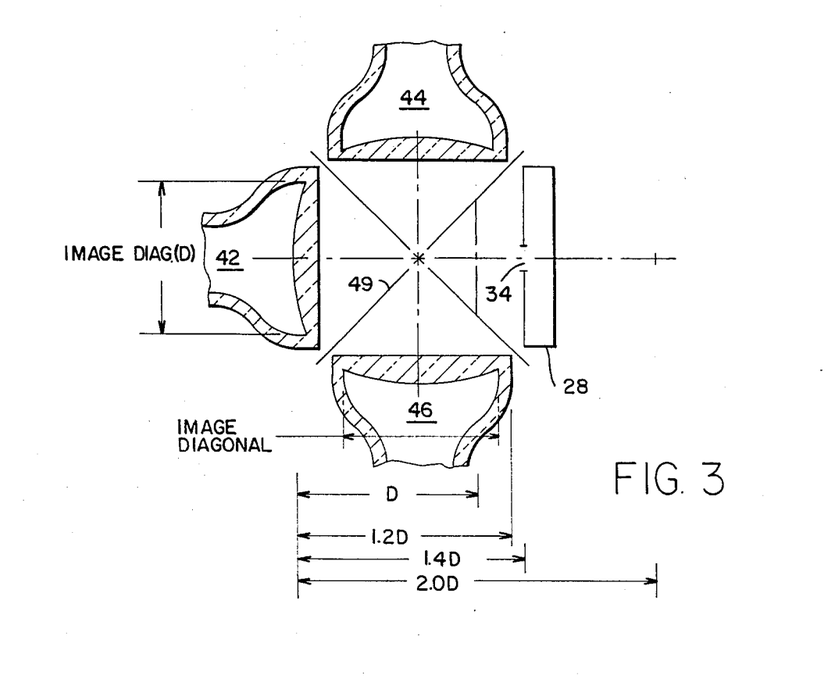
FIG. 3 illustrates the preferred location of projection optics with respect to a three tube image projection system.
Figures 3A, 4A:
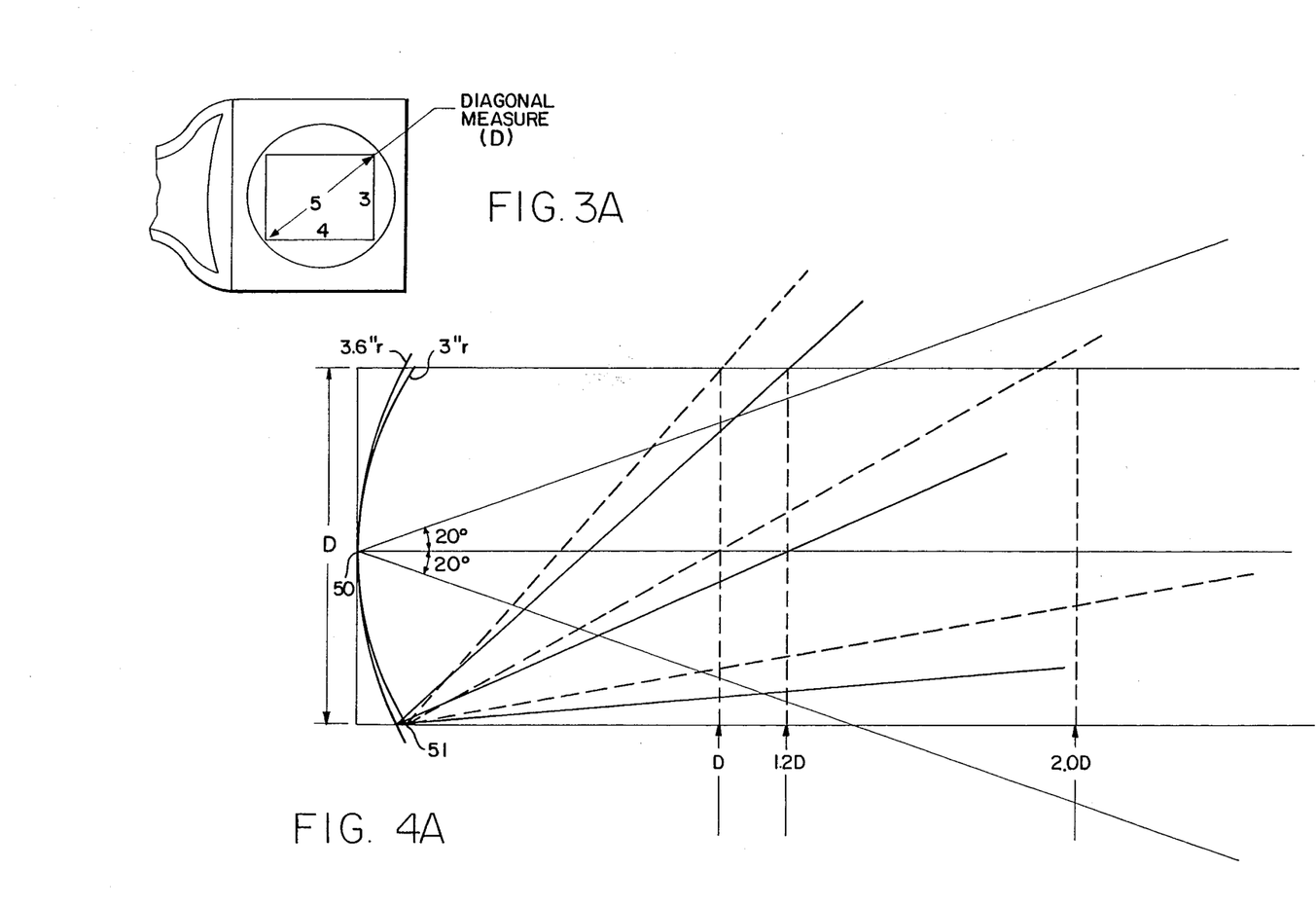
FIG. 3A illustrates the aspect ratio of an image produced by cathode ray tubes 42, 44, 46.
FIG. 4A illustrates the effect of changing the radius of curvature R on the light concentration in a fixed aperture for a 3.6 inch radius of curvature vs. a 3 inch radius of curvature.

Referring now to FIG. 3, there is shown a three tube color projection system using three single color concave surface cathode ray tubes. The tubes 42, 44, 46 are arranged to have one tube 42 on axis with the projection optics 28, while tubes 44 and 46 are orthogonal thereto. Each tube has an image diagonal of 3 inches and radius of curvature of 1.2 times the image diagonal D and produces a rectangular image as shown in FIG. 3A, from conventional deflection signals. The image diagonal can be defined as the maximum linear dimension of the generated image measured perpendicular to the axis of the tube. The images are combined by dichroic mirrors 49 having a sufficient width to capture the full dimensions of the rectangular image shown in related FIG. 3A to have a conventional 3, 4, 5 aspect ratio. In practice, each dichroic mirror 49 has a length substantially equal to 1.4 times the dimension of the rectangular image.

The individual tubes must be substantially equidistantly positioned with respect to the crossover point of the dichroic mirrors 49. The optimum light collection point as shown in FIG. 2, equal to the radius of curvature, cannot be obtained due to mechanical interference with the tubes 42, 44 and 46, unless the relationship between image diagonal and radius of curvature R of $1.2 < R/D$ is met. This will effectively move the center for the radius of curvature outward to a point beyond the edge of CRT 44 and 46. The central point 34 of the entrance pupil of the lens 28 may be positioned at a distance represented by the radius of curvature measured from the image generation surface along the optical axis of each tube 42, 44 and 46. The minimum distance of 1.2D includes an allowance for glass thickness of the three tubes and mounting hardware which is an inside limit for the position of lens 28 with respect to the CRT 42, 44 and 46.

Referring to FIG. 4A, there is shown the effect of changing the radius of curvature from a 3 inch radius of curvature to a 3.6 inch radius of curvature on the light dispersion of an image generating cathode ray tube having an image diagonal of 3 inches. The amount of light contained within a 3 inch aperture clearly decreases beyond the distance D, which is a distance equal to the image diagonal, measured along the axis of the image generating surface. At 1.2D, wherein D is the image diagonal of 3 inches for both tubes shown, a significant but lesser amount of light is captured for the tube having the 3.6 inch radius of curvature. Locating the entrance pupil optics at 1.2D, the minimum distance in which three tubes can be placed in the configuration of FIG. 3 demonstrates that a substantial portion of the emitted light is captured in a 3 inch aperture located at 1.2D.

Figure 4B:
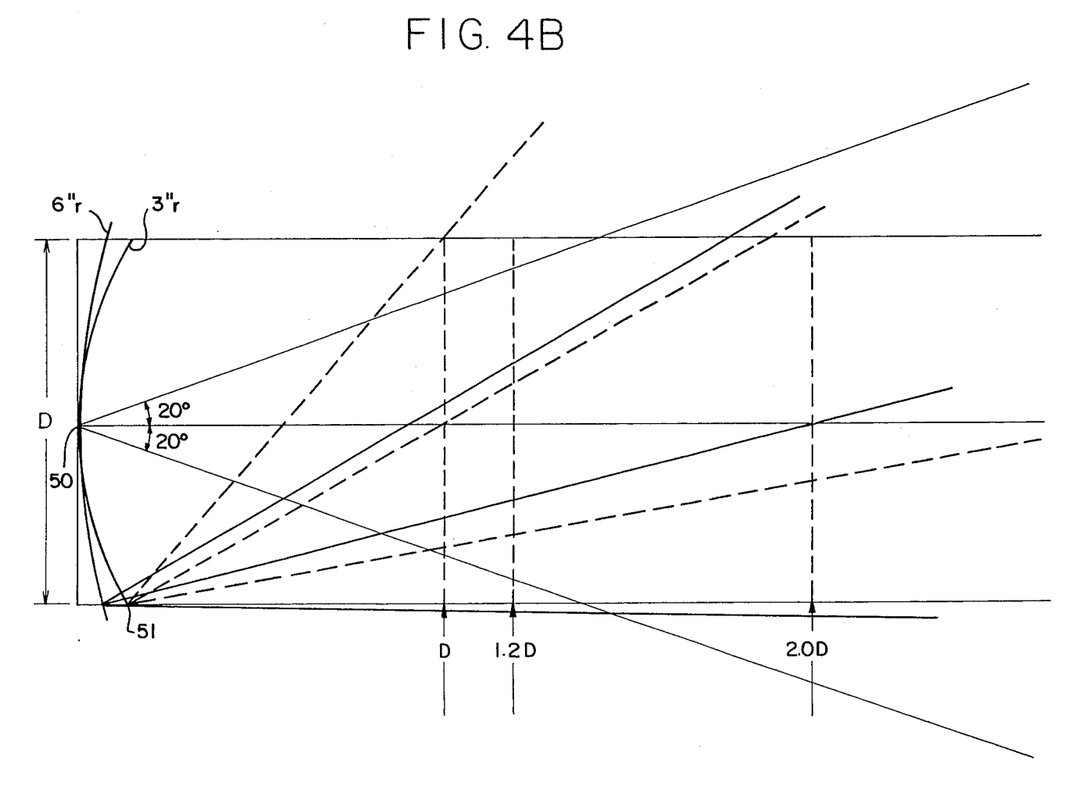
FIG. 4B illustrates the effect of changing the radius of curvature R on the light concentration in a fixed aperture for a 6 inch radius of curvature vs. a 3 inch radius of curvature.

Referring to FIG. 4B, there is shown another example of a CRT having a concave faceplate, with a 6 inch radius of curvature. The image diagonal D in this illustration is also 3 inches. As the distance from the image generating surface increases beyond 1.2 times the image diagonal D, the amount of light captured in a 3 inch aperture also decreases. However, at 2 times the diagonal, the 6 inch radius light emitting surface still provides for considerable light concentration advantages over a flat screen. In practice, a radius of curvature between 3 and 12 inches may be employed observing the relationship $1.2 < R/D < 2.0$.

Figure 5:
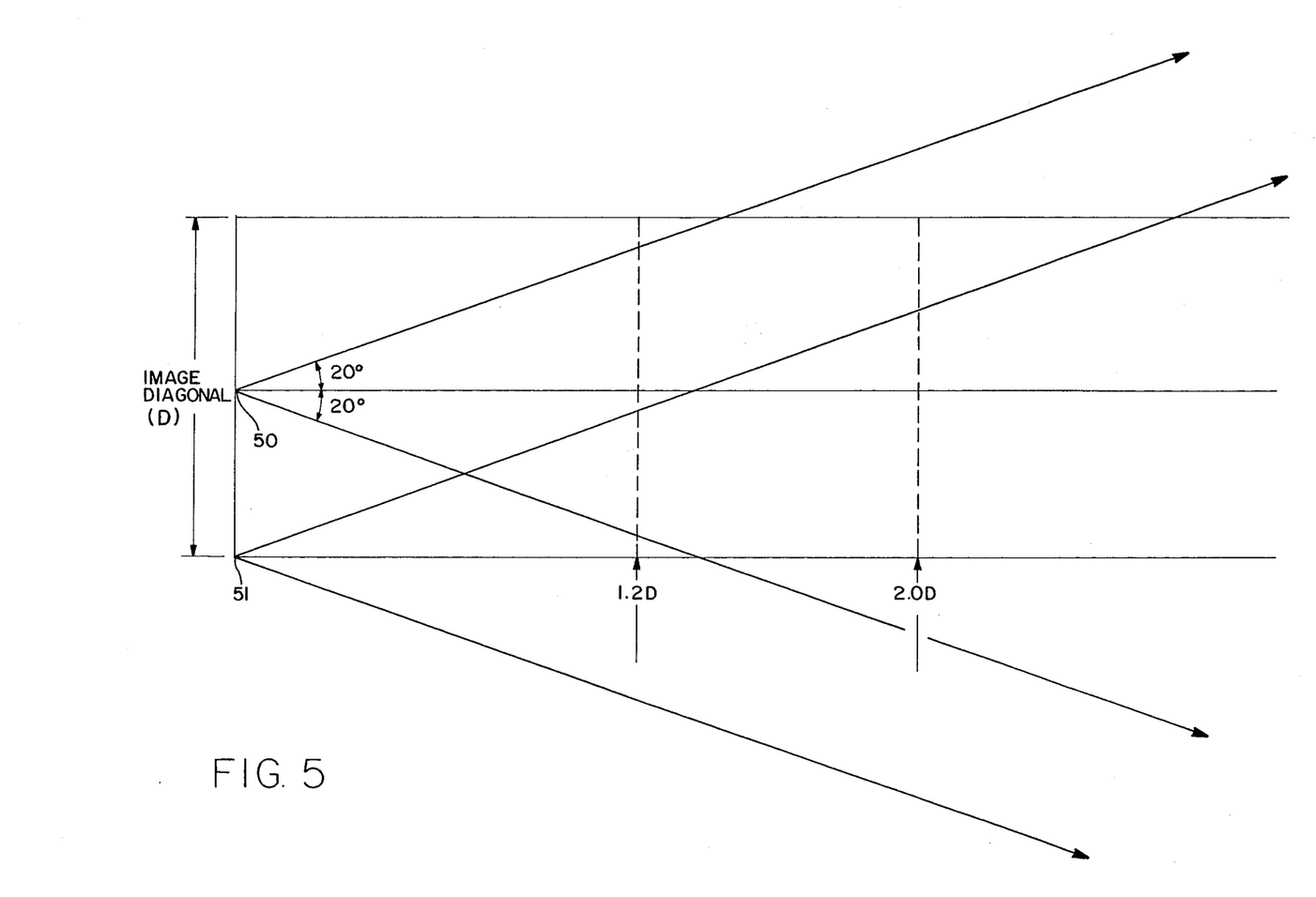
FIG. 5 illustrates the disadvantages of a flat screen CRT in providing an effective light distribution.

Referring to FIG. 5, there is shown the light dispersion effects of a flat screen having the same image diagonal at comparable distances. Assuming the same image diagonal D of 3 inches for a flat screen, at an axial distance of 2.0 times the image diagonal, the amount of light captured in a 3 inch aperture decreases considerably over what is available from a concave image generating surface such as is shown in FIG. 4B.

Thus, having seen that the physical limitations of the concave CRT tubes do not permit an entrance pupil to be located at a distance much less than 1.2 times the image diagonal, by selecting a radius of curvature to be greater than 1.2 times the image diagonal, it is possible to position the projection lens entrance pupil at a distance equal to the radius of curvature for a three tube configuration as is shown in FIG. 3. As the foregoing FIGS. 4A, 4B demonstrate, light gathering efficiencies can still be obtained with the curved concave faceplate over a flat screen, as demonstrated in FIG. 5, when the radius of curvature is greater than 1.2 times the image diagonal, and less than 2.0 times the image diagonal. It is therefore possible to maintain the radius of curvature to image diagonal within this range to permit the entrance pupil for the projection optics to be located at the optimum location for maximum light gathering efficiency.

Referring again to FIG. 3, it is apparent that the projection optics 28 entrance pupil 34 can be placed at a distance from each of the three projection tubes 42, 44 and 46 at a distance equal to the radius of curvature when the foregoing relationship between radius of curvature and image diagonal are observed. The resulting structure will provide for greater light collection efficiency than is obtained with a flat screen CRT system.

Figure 6:
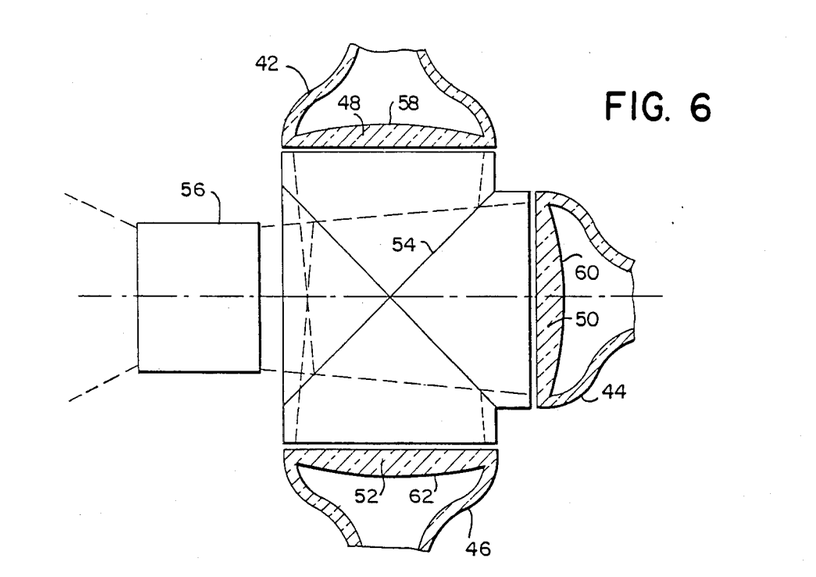
FIG. 6 illustrates a three cathode ray tube version of the system according to the invention.

As previously stated, the faceplate 24 can be either of uniform or non-uniform thickness. However, in the application illustrated in FIG. 2, a uniform thickness faceplate such as the faceplate 24a may be advantageous in that the constant thickness faceplate does not optically affect the image produced on the surface 26 in a manner that would require correction by the lens system 28. However, in other applications, a non-uniform thickness faceplate may be desirable, particularly if it is compatible with the optics being used. One such application is illustrated in FIG. 6. In the embodiment illustrated in FIG. 6, three separate cathode ray tubes 42, 44, 46 having non-uniform thickness faceplates 48, 50 and 52, respectively, have their respective images combined by a prism 54 and projected by a lens system 56. In the system illustrated in FIG. 6, each of the cathode ray tubes 42, 44, 46 generates an image in one of the primary colors, preferably red, blue and green, that is combined by the prism 54 to form the complete color image. In such an application, cathode ray tubes having faceplates with flat exterior surfaces provide ready optical coupling to the prism 54, although some modification to the design of the lens system 56 or to the prism 54 may be required to compensate for the non-uniform thickness of the faceplates. Also, because of the difference in the index of refraction of the prism 54 and that of air, the spacings between the lens system 46 and the inner surfaces 58, 60, 62 of the faceplates 48, 50 and 52 must be adjusted to account for the difference in index of refraction. In addition, the radii of the surfaces 58, 60 and 62 must also be adjusted so that the radii, as well as the distances, are such that each of the surfaces 58, 60 and 62 is optically concentric about the effective light entry point. In this embodiment as well, the radius of curvature R is selected according to the foregoing relationship $1.2 < R/D < 2.0$, permitting substantial light collection efficiencies to be achieved over flat screen surfaces.

When a concave light emitting surface is used in conjunction with a coupling element such as a coupling element 100 (FIG. 7), the coupling element must be designed to be compatible with the radius of curvature of the light emitting surface in order to assure optimum concentration of light into the lens system. For example, the thickness of the coupling medium greatly affects the concentration of energy into the lens system. For example, if the coupling medium 100 is used in conjunction with a concave surface when viewed from the faceplate light emitting surface 102, the thickness of the coupling medium 100 greatly affects the energy distribution.

Figures 7, 8:
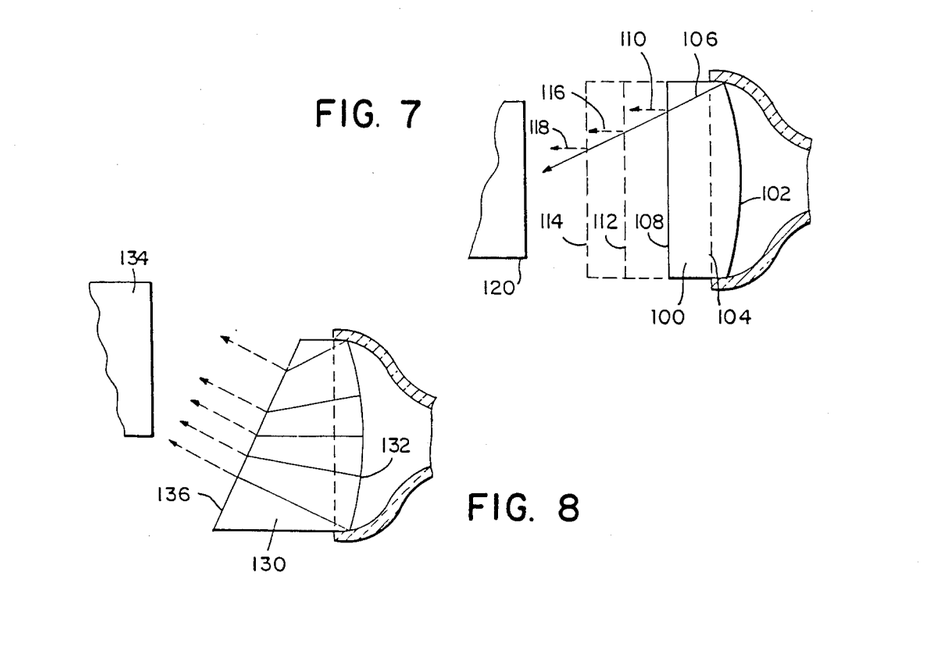
FIG. 7 illustrates the effects of a coupling medium on the transfer of energy between the light emitting surface and the lens system.
FIG. 8 illustrates the use of a coupling medium having an axially tilted surface to correct keystone distortion.

For example, assume that the coupling medium 100 is a solid, such as a glass or plastic coupling medium, or a liquid coupling medium, and further assume that the coupling medium and the cathode ray tube form an immersed system. In such a system, discontinuities between the various elements, such as the discontinuity at the faceplate 104, are invisible. Consequently, the light emitted from the light emitting surface 102 travels in a direction perpendicular to the surface 102 as is illustrated by the ray beam 106. However, once the ray beam 106 exits the coupling medium 100, it exits in a direction perpendicular to the face of the coupling medium as dictated by Snell's Law of Refraction. Thus, if the thickness of the coupling medium were defined by a plane 108, the ray beam 106 would be deflected as it exists the surface 108 and exits the coupling medium 100 as indicated by the dashed line 110. Similarly, if the coupling element 100 would be made thicker as illustrated by the dashed surfaces 112 and 114, the beam would exit at the points illustrated by the dashed lines 116 and 118, respectively. Thus, if a lens 120 were placed adjacent to the coupling element 100, the amount of light energy entering the lens 120 would be dependent upon the thickness of the coupling element 100 and the diameter of the effective aperture of the lens 120. Consequently, the coupling element 100 must be made thick enough so that the energy is concentrated in a small enough area so that little or no energy is excluded by the aperture stop of the lens 120. Typically, the distance between the surface 102 and the flat surface of the coupling element must exceed 10% of the radius of curvature of the surface 102 to assure optimum coupling. Alternatively, rather than using a separate coupler such as the coupler 100, the coupler may be formed integrally with the faceplate of the cathode ray tube by making the faceplate the required thickness.

One problem generally associated with projection television system is keystone distortion that results from the tilt of the viewing screen with respect to the projection lens system. Such keystone distortion may be corrected to some extent by tilting the cathode ray tube with respect to the lens system as is disclosed, for example, in U.S. Pat. No. 4,274,110. However, such distortion can be even more accurately corrected by utilizing a coupling medium having a plano exit surface that is tilted relative to the surface of the cathode ray tube. Such a system is illustrated in FIG. 8. In the system illustrated in FIG. 5, a coupling medium 130 is used to couple a light emitting surface 132 to a lens system 134 in order to correct keystone distortion without tilting the axis of the cathode ray tube with respect to the lens 134. This is accomplished by utilizing a tilted surface 136 on the coupling medium 130. Thus, by appropriately adjusting the tilt of the surface 136, the keystone distortion can be minimized. By adjusting the thickness of the coupling medium 130, the amount of energy applied to the lens system 134 can also be optimized. Thus keystone distortion can be corrected while still preserving the improved energy concentration provided by the curved light emitting surface 132.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A multiple tube projection television system comprising:
   at least two image generating cathode ray tubes, each of said tubes having an image generating concave phosphor surface having a radius of curvature which is 1.2 to 2.0 times an image diagonal of each of said tubes; and
   a projection lens system having an entrance pupil located at a given optical distance from the concave phosphor surface of each of said tubes along an optical path aligned with an axis of the corresponding one of said tubes, said given optical distance being substantially equal to the radius of curvature of said concave phosphor surfaces;

said concave phosphor surfaces and said projection lens system cooperating to increase the amount of light input to an entrance aperature of said projection lens system, thereby permitting a smaller entrance aperture to be used to capture the same amount of light, or increasing the amount of light captured by an entrance aperture of a given size.

2. The multiple tube projection system of claim 1 wherein said radius of curvature is between 3 and 12 inches.

3. The multiple tube projection system of claim 1 wherein each of said cathode ray tubes has a faceplate supporting said concave phosphor surface which has an exterior surface and a thickness at the center thereof in excess of 10% of said radius of curvature.

4. The projection system recited in claim 1 further including a coupler interposed between each of said cathode ray tubes and said projection lens system, said couplers each having an exterior surface disposed adjacent said projection lens system.

5. The projection system recited in claim 4 wherein said axes of said cathode ray tubes are longitudinal axes, and wherein the exterior surface of at least one of said couplers is tilted with respect to the longitudinal axis of the corresponding tube.

6. The projection system recited in claim 4 wherein said couplers are solid couplers.

7. The projection system recited in claim 6 wherein said couplers and said cathode ray tubes form an immersed system.

8. The projection system recited in claim 4 wherein said couplers are liquid couplers.

9. The projection system recited in claim 1 further including mirror means for combining images generated by said cathode ray tubes to form a composite image.

10. The projection system recited in claim 9 further including a coupler interposed between said cathode ray tubes and said projection lens system, said coupler having an exterior surface disposed adjacent said projection lens system.

11. The projection system recited in claim 10 wherein said coupler is a solid coupler.

12. The projection system recited in claim 11 wherein said coupler and said cathode ray tubes form an immersed system.

13. The projection system recited in claim 10 wherein said coupler is a liquid coupler.

14. A television projection system comprising:
a projection lens system having a predetermined light entry point and a predetermined optical axis;
a cathode ray tube having a longitudinal axis and a light emitting surface, said surface being curved and concave when viewed from the projection lens system, the center of said surface being normal to said longitudinal axis, the longitudinal axis of said cathode ray tube being parallel to and offset from the optical axis of the projection lens system; and
a refractive coupling medium interposed between said light emitting surface and said projection lens system, said coupling medium having an exterior surface facing toward said projection lens system, said exterior surface being tilted with respect to the longitudinal axis of said cathode ray tube.

15. A cathode ray tube for use with a television projection system having a faceplate having a light emitting interior surface, said surface being curved and concave when viewed through the faceplate of the cathode ray tube, said surface having a predetermined image diagonal measure and a radius of curvature equal to 1.2 to 2.0 times the image diagonal measure, said faceplate having an exterior surface and a thickness at the center thereof in excess of 10% of the radius of curvature of the light emitting surface.

16. A cathode ray tube as recited in claim 15 wherein said cathode ray tube has a longitudinal axis and wherein the center of said light emitting surface is normal to the longitudinal axis and the exterior surface of the faceplate is tilted with respect to said longitudinal axis.

* * * * *